(12) United States Patent
Aurangabadkar (10) Patent No.: US 11,734,617 B2
(45) Date of Patent: Aug. 22, 2023

(54) ONLINE SEAMEN TRAVEL TICKET BOOKING

(71) Applicant: Varsha Aurangabadkar, Mumbai (IN)

(72) Inventor: Varsha Aurangabadkar, Mumbai (IN)

(*) Notice: Subject to any disclaimer, the term of this patent is extended or adjusted under 35 U.S.C. 154(b) by 0 days.

(21) Appl. No.: 17/508,797

(22) Filed: Oct. 22, 2021

(65) Prior Publication Data

US 2022/0114503 A1 Apr. 14, 2022

Related U.S. Application Data (63) Continuation of application No. 15/521,169, filed as application No. PCT/IN2015/000174 on Apr. 16, 2015, now abandoned.

(30) Foreign Application Priority Data

Oct. 22, 2014 (IN) .......................... 3380/MUM/2014

(51) Int. Cl.
  *G06Q 10/02* (2012.01)
  *G06Q 10/08* (2023.01)
  *G06Q 50/14* (2012.01)

(52) U.S. Cl.
  CPC ............. *G06Q 10/02* (2013.01); *G06Q 10/08* (2013.01); *G06Q 50/14* (2013.01)

(58) Field of Classification Search
  CPC ......... G06Q 10/02; G06Q 10/08; G06Q 50/14
  USPC .......................................................... 705/5
  See application file for complete search history.

(56) References Cited

U.S. PATENT DOCUMENTS

| | | | | |
|---|---|---|---|---|
| 6,807,458 B2* | 10/2004 | Quackenbush | ........ | G06Q 10/08 705/5 |
| 2004/0199403 A1* | 10/2004 | Ananda | .............. | G06Q 10/0831 705/331 |
| 2005/0021424 A1* | 1/2005 | Lewis | .................. | G06Q 10/025 705/26.1 |
| 2005/0288973 A1 | 12/2005 | Taylor et al. | | |
| 2008/0319808 A1 | 12/2008 | Wofford et al. | | |
| 2012/0330906 A1* | 12/2012 | Fredericks | ............. | G06Q 50/14 707/E17.058 |
| 2014/0019176 A1* | 1/2014 | Mandelbaum | ....... | G06Q 10/025 705/6 |
| 2014/0278590 A1* | 9/2014 | Abbassi | .............. | G06F 16/9024 705/5 |

(Continued)

OTHER PUBLICATIONS

"Online driver of consumer purchase of website airline tickets" Published by Elsevier (Year: 2013).*

*Primary Examiner* — Zeina Elchanti
(74) *Attorney, Agent, or Firm* — Rothwell, Figg, Ernst & Manbeck, P.C.

(57) ABSTRACT

Disclosed herein are a method and a system for facilitating seamen ticket booking. The system provides means for the user to specify requirements and book tickets. The system, by contacting associated service providers, identifies suitable flight schedule from an airport which is nearest to the location mentioned by the user. Upon identifying at least one suitable schedule, details of the same are sent to the user, and any other authorized person who may be monitoring the user's actions. Upon getting approval, the system books ticket and send confirmation and other details to the user. The system also provides visa requirement related information to the user, and allows filing of visa request online.

32 Claims, 4 Drawing Sheets

(56) References Cited

U.S. PATENT DOCUMENTS

2015/0032768 A1  1/2015 Miller et al.
2015/0149220 A1  5/2015 Omar

* cited by examiner

ONLINE SEAMEN TRAVEL TICKET BOOKING

CROSS-REFERENCE TO RELATED APPLICATION

The present application is a continuation of U.S. patent application Ser. No. 15/521,169, filed Apr. 21, 2017, which is a 35 U.S.C. § 371 National Phase Entry Application from PCT/IN2015/00174, filed Apr. 16, 2015, designating the United States, and also claims the benefit of Indian Application No. 3380/MUM/2014, filed Oct. 22, 2014, the disclosures of which are incorporated herein by reference in their entireties.

TECHNICAL FIELD

The embodiments herein relates to online ticket booking, and more particularly to a mechanism for facilitating online seamen ticket booking.

BACKGROUND

Online ticket booking is a revolution that facilitated users to book bus/train/airline tickets from practically anywhere in the world. All the service providers come under one roof and user gets best possible rates and facilities over a click. It is a tool empowering travel agents to keep a track of bookings/cancellations done, making reports, high margins maintenance. The existing travel booking systems did achieve this for users, travel agents, service providers. However, ticket booking for seamen requires to follow a different procedure, and as of now, there is no system that facilitates booking of a seaman ticket online.

Seamen air tickets are booked for people joining ship for work or people leaving ship after work or after completing contract period. Such people need to travel from airport nearest to home town or any location to airport nearest to port, and vice versa.

Shipping Companies need to complete different set of documentation and formalities for such seamen travel. These formalities are usually very tedious, time consuming demanding dedicated man power.

There may be a link of Manning Company between a travel agent and shipping Company. Manning Company arranges candidates for shipping Company who can work on a ship for certain period. Crew Operator from Manning Company looks after all the formalities and documentation. Crew operator interacts with travel agent to get required flight arrangements subject to visa regulations. On the other hand, the crew operator monitors entire process and coordinates processes between owner, Master of the respective ship, and the Port agent who is supposed to carry out formalities for crew change at respective port. For the crew operator it is complex task to coordinate with multiple agencies and owner at other hand, at the same time monitor ship schedule which is critical depending on the dynamic nature of sea. This adds to the difficulties associated with seamen ticket booking as ticket availability and its cost vary from time to time.

Few shipping companies use customized desktop applications to book tickets for their employees. These desktop applications are confined to a company's own travel necessities. Getting ex-local fare tickets, fare comparisons, management approval, port agent's intimation, visa formalities, non-visa travel for seaman are not fully automated.

OBJECT OF INVENTION

The principal object of the embodiment herein is to provide a system and method for facilitating online seamen ticket booking.

Another object of the embodiment herein is to provide a system and method for providing online visa services to the users.

Another object of the embodiment herein is to provide a system and method for providing hotel, and car rental services to the users, as part of the seamen ticket booking service.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

STATEMENT OF INVENTION

Accordingly the invention provides a method for online seamen ticket booking. A ticket booking request is received from a user using a central ticket management server, wherein the ticket booking request comprises of origin, destination, time, and date information. Further, the received request is analyzed to check if the ticket booking request is pertaining to a seamen ticket booking, using the central ticket management server. If the ticket booking request is pertaining to the seamen ticket booking, then at least one seamen ticket that matches the ticket booking request is identified, using the central ticket management server. Further, the seamen ticket details are provided to the user, using the central ticket management server, wherein the seamen ticket details comprises at least one of a seamen ticket fare, fare comparison between the seamen ticket and a normal ticket i.e. a non-seamen ticket, ticket availability, time, flight details, and origin and destination details. Further, approval request is sent to an authority, using the central ticket management server, and if the ticket booking is not approved, then at least one ticket modification option is provided to the user, using the central ticket management server. Upon receiving approval, then the ticket is booked and the details are displayed to the user.

Accordingly the invention provides a system for online seamen ticket booking. The system is configured to receive a ticket booking request from a user using a central ticket management server, wherein the ticket booking request comprises of origin, destination, time, and date information. The system then analyzes the received request to check if the ticket booking request is pertaining to a seamen ticket booking, using the central ticket management server. If the ticket booking request is pertaining to the seamen ticket booking, then at least one seamen ticket that matches the ticket booking request is identified, using the central ticket management server. Further, the system provides seamen ticket details to the user, using the central ticket management server, wherein the seamen ticket details comprises at least one of a seamen ticket fare, fare comparison between the seamen ticket and a normal ticket, ticket availability, time, flight details, and origin and destination details. Further, the system sends approval request to an authority, using the central ticket management server, and if the ticket booking is not approved, then at least one ticket modification option is provided to the user, using the central ticket management server. Upon receiving approval, then the system books the ticket and the details are displayed to the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 3B, where similar reference characters denote corresponding features consistently throughout the figures, there are shown embodiments.

Figure 1:
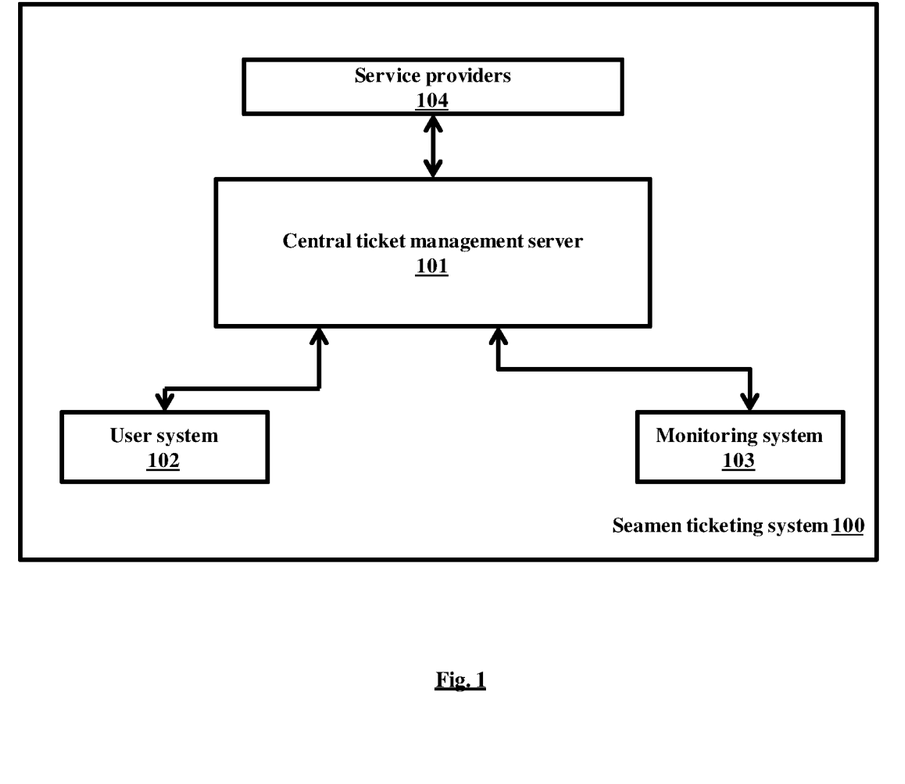
FIG. 1 is a block diagram that illustrates architecture of a seamen ticketing system, as disclosed in the embodiments herein.

FIG. 1 is a block diagram that illustrates architecture of a seamen ticketing system, as disclosed in the embodiments herein. The seamen ticketing system 100 comprise of a central ticket management server 101, a user system 102, a monitoring system 103, and service providers 104.

The central ticket management server 101 may be configured to communicate with the user system 102 to collect a service request from a user, wherein the service request is pertaining to seamen ticket booking. The central ticket management server 101 may be further configured to collect at least one input required to process the service request. The central ticket management server 101 may be further configured to communicate with at least one service provider 104 to serve the service request received from the user system 102. The user system 102 may refer to any of Shipping Companies, Manning Agent, crew operator, offshore passenger and/or offshore company, or any third party agent/sub-agents as may be appointed by the shipping company or any sub agent, for initiating Seamen ticket booking process. The central ticket management server 101 may be further configured to communicate with the monitoring system 103 to facilitate monitoring of the seamen ticket booking process. The central ticket management server 101 may be further configured to provide offshore fare information to users. Off shore fare is meant for users who work on rigs. The central ticket management server 101 may be further configured to provide Ex local fare information to users. The Ex local fare represents a special fare from a country of origin. For example, if 'X' is the country of origin, then travel fare from 'X' may be cheaper. In this scenario, the central ticket management server 101 may provide Ex local fare information from various countries, so that the user may select a ticket which is cheapest as compared to other ticket fares.

Figure 2:
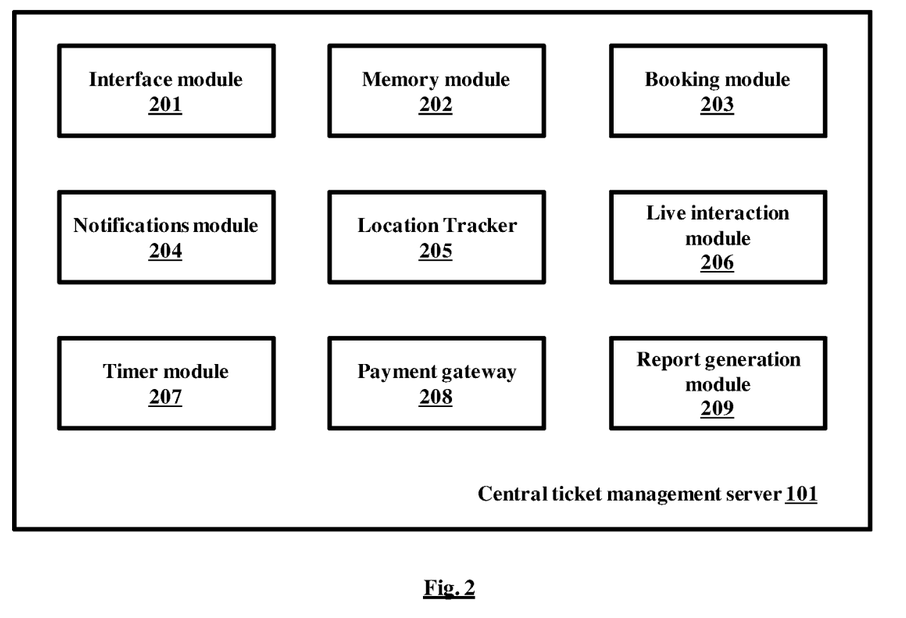
FIG. 2 is a block diagram that illustrates various components of a central ticket management server, as disclosed in the embodiments herein.

FIG. 2 is a block diagram that illustrates various components of a central ticket management server, as disclosed in the embodiments herein. The central ticket management server 101 comprises of an interface module 201, a memory module 202, a booking module 203, a notifications module 204, a location tracker 205, a live interaction module 206, a timer module 207, a payment gateway 208, and a report generation module 209.

The interface module 201 may be configured to provide means for connecting the central ticket management server 101 with the user system 102, the monitoring system 103, and at least one service provider 104, using suitable communication channels. In various embodiments, the communication channel may be wired, wireless, or a combination thereof. The interface module 201 may be further configured to convert data received from the user system 102, monitoring system 103, and the service providers 104, if required, to make the data compatible for further processing.

The memory module 202 may be configured to store any data associated with the seamen ticket booking process. For example, the memory module 202 may, for each session of seamen ticket booking, collect and store requirements and other inputs received from the user system 102, such that the data may be collected by other components of the central ticket management server 101, for further processing; wherein further processing may refer to ticket booking, ticket cancellation, or modifying a ticket. The memory module 202 may be further configured to save all data associated with a seamen ticket booking, as history data; wherein the history data may be used for future reference, and/or for any purpose associated with the seamen ticket booking process. In various embodiments, the memory module 202 may save the data permanently, or temporarily for a specific time period.

The booking module 203 may be configured to process a service request pertaining to booking of a seamen ticket or a non-seamen ticket, based on a request received from the user. In a B2B (Business To Business) scenario, the user may be shipping companies/demo owners/offshore Companies/manning agent/any 3rd party agent/sub agents/sea fearer/port agents as may be appointed by shipping company. The demo owner is owner/agent of a vessel meant for demolition. In a B2C (Business To Customer) scenario, the user may be seamen, crew, any representative of companies mentioned in B2B scenario, any person who is attempting to book tickets on behalf of traveler, or the traveler/passenger himself. The booking module 203 may be further configured to modify a ticket which is already booked or in the processing stage, based on a modification request received from the user. The booking module 203 may be further used to cancel a ticket which is already booked or is in the booking phase, upon receiving a cancellation request from the user.

The notifications module 204 may be configured to send notifications to users, upon occurrence of certain events, as configured by the user. For example, the notification module 204 may send notifications to intimate the user about successful ticket booking, cancellation of ticket, modification of ticket and so on. The notification module 204 may further send intimations to monitoring systems, indicating any action initiated by the user with respect to booking, modification, or cancellation of tickets. Other examples include, but not limited to, sending daily updates to user with respect to cancellation of ticket, modification of ticket, card swipe, reminder to issue ticket in time, and cancellation penalty.

The location tracker 205 may be configured to monitor and track location of the user/passenger and/or the vessel, comprise of any suitable geo-location tracking and identifying system such as GPS (Global position Tracker). The location information thus identified may be used by the booking module 203 in deciding a suitable schedule for the user.

The live interaction module 206 may be configured to provide suitable means for the user to interact with authorized people who are managing and monitoring any function associated with the seamen ticket booking, non-seamen ticket booking, and visa related processes. The live interaction module 206 may be further configured to provide at least one option for the user to communicate with at least one person who can provide ticket booking/cancellation/modification assistance, which may be provided on a 24*7 basis. For example, the live interaction module 206 may provide an Instant Messaging (IM) for the user to communicate with an executive who can provide assistance to the user.

The timer module 207 may be used when time stamp information pertaining to certain events needs to be collected and recorded. For example, time information pertaining to booking/cancellation/modification of a ticket may be recorded, for any further reference purpose. The timer module 207 may be further used to indicate time within which certain operations need to be executed by the user. For example, the user may have to complete online transaction within a set time limit, from the moment the booking has been initiated. The same time period may be offered as a facility for the user for holding the ticket booking.

The payment gateway 208 may be configured to provide at least one option for the user to make payment while booking a ticket using the seamen ticketing system 100. The payment gateway 208 may be further configured to credit back an amount to the user's account, after any deductions mandated by rules, when the user is cancelling a ticket which has already been booked.

The report generation module 209 may be configured to generate report which indicates various transactions made by the user, during a selected time period, wherein the transaction may refer to booking, cancellation, or modification of a ticket. The report generation module 209 may be further configured to generate report(s) that indicate information such as but not limited to vessel related, expense related, and traveler related information. The report generation module 209 may be configured to generate the report based on transaction (s) made during a particular time span. For example, different reports may be generated which indicate transaction (s) made on a daily, weekly, monthly, or yearly basis.

Figure 3A:
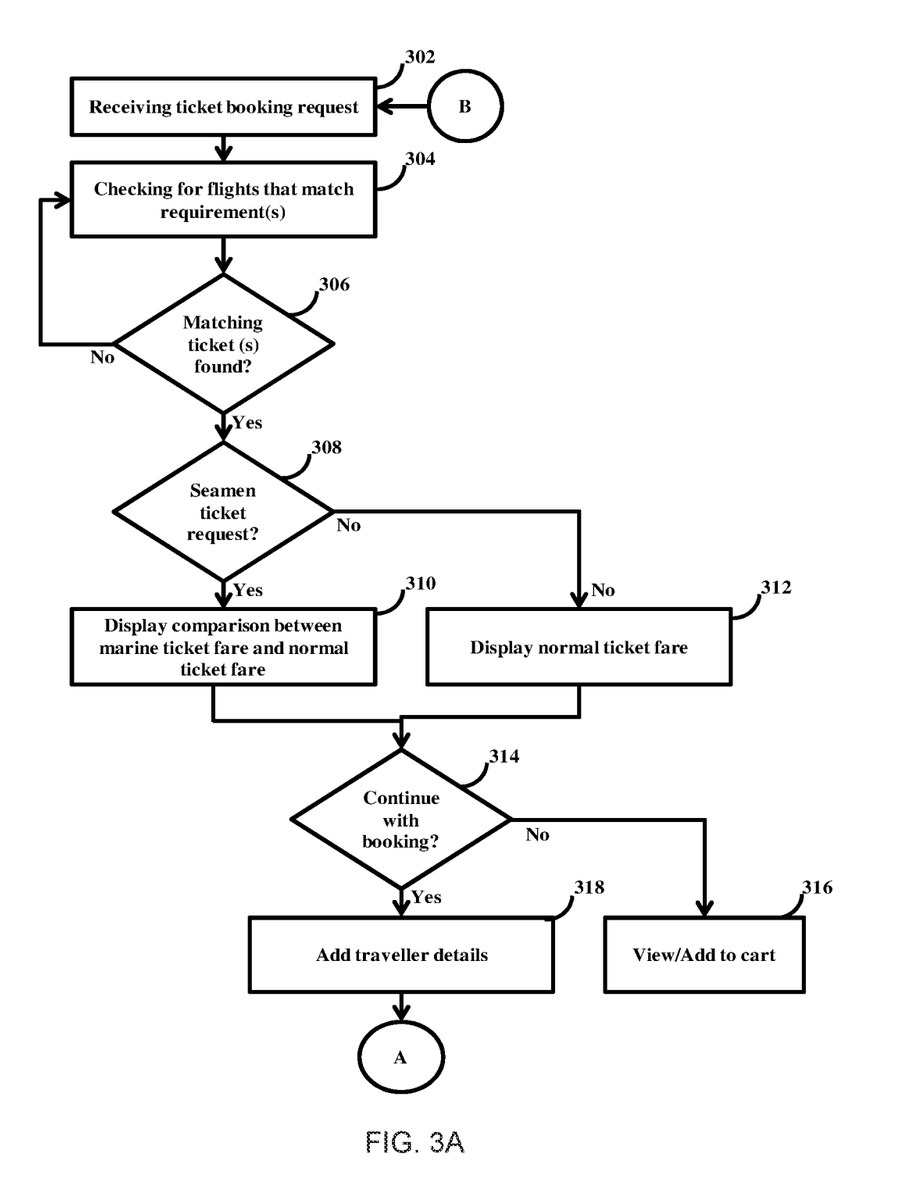
FIGS. 3A and 3B are flow diagrams that show various steps involved in the process of booking a ticket using the seamen ticketing system, as disclosed in the embodiments herein.
Figure 3B:
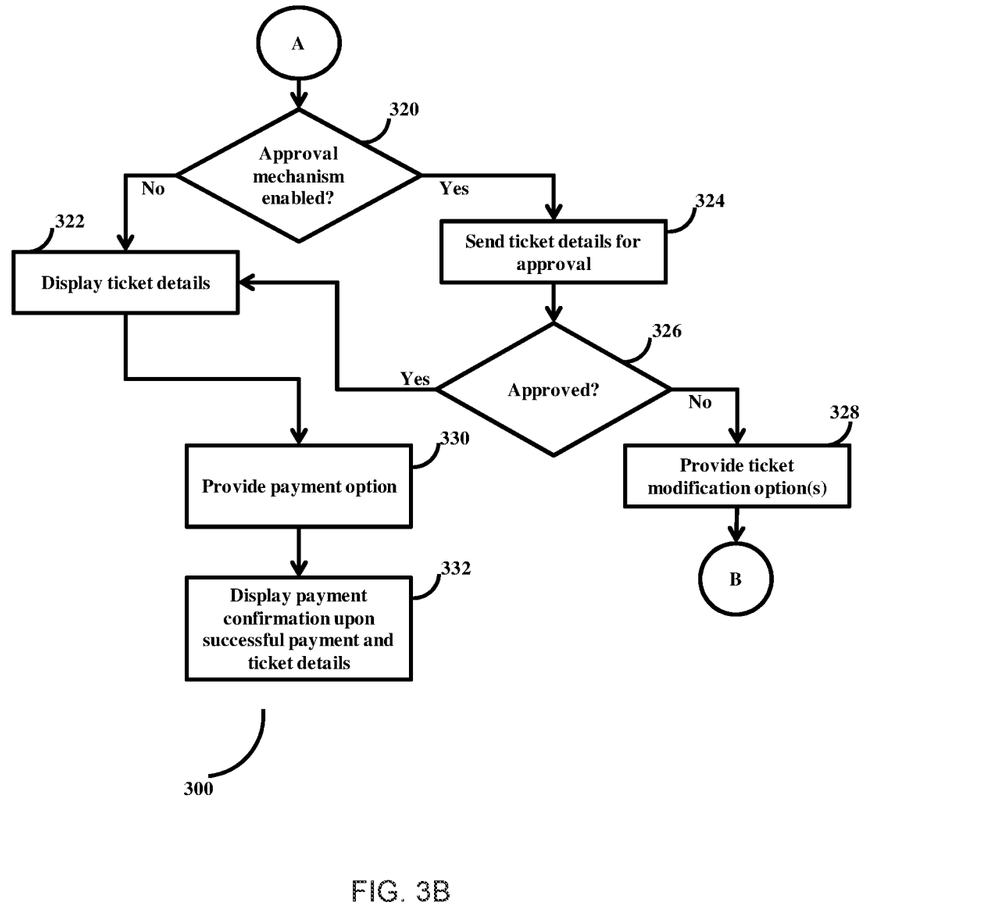

FIGS. 3A and 3B are flow diagrams that show various steps involved in the process of booking a ticket using the seamen ticketing system, as disclosed in the embodiments herein. The central ticket management server 101 receives (302) a ticket booking request, from an associated user system 102. The ticket booking request may comprise of information such as but not limited to origin and destination locations, date of journey, and approx time of journey. Upon receiving the ticket booking request, the central ticket management server 101 processes the received request using a booking module 203, and checks (304) for availability of at least one flight that matches requirements specified in the ticket booking request. In a preferred embodiment, before checking the availability of tickets, the central ticket management server 101 identifies at least one airport nearest to the origin and destination specified by the user. In this process, the central ticket management server 101 searches for airports near to the specified locations/ports, and further, based on the distance to each of the airports, shortlists and suggests the nearest airport to the source and destination locations. Upon identifying at least one match (306), the central ticket management server 101 checks type of the received ticket booking request to identify whether the ticket booking request received corresponds to a marine/seamen ticket booking request or a normal ticket booking request. The normal ticket refers to a non-seamen ticket. In an embodiment, the central ticket management server 101 may check the type of the ticket booking request based on any specific type of identifier associated with the received request. In another embodiment, the central ticket management server 101 may prompt the user who is initiating the ticket booking request, to specify using a suitable option, the type of ticket he/she is intending to book. For example, the user may choose from a drop down menu, the type of ticket to be searched for. If no matching flight is found, then the central ticket management server 101 may automatically initiate an online chat for the user to communicate with a customer service executive who can provide assistance in terms of ticket booking.

In a preferred embodiment, the central ticket management server 101 may provide visa information which indicates whether traveler requires visa for the country he is destined for or for the country he may be transiting through. This information may help the user to decide whether he/she requires visa services or not. The central ticket management server 101 may further provide option for the user to request for visa online, by providing a suitable interface. The central ticket management server 101 may further provide visa information such as but not limited to documentation, time taken for processing visa, and visa fees.

If the user has requested for a seamen ticket, the booking module 203 fetches from an associated database, seamen and non-seamen ticket fare details for the identified ticket, and displays (310) a comparison between the seamen and non-seamen ticket fares, and any such associated details. If the user has requested for a non-seamen ticket, the booking module 203 fetches from an associated database, non-seamen ticket fare details for the identified ticket, and displays (312) non-seamen ticket fares, and any such associated details. By checking the displayed details, the user who is trying to book the tickets may decide whether or not to continue with the ticket booking. The associated details may refer to flight time, flight number, journey date and time, ticket cost, baggage details, and any such selected essential and non-essential data related to the trip.

If the user decides not to continue with the ticket booking, then the booking module 203 provides option for the user to view (316) the cart and/or add the search result, to the cart. The cart option helps the user to save search results for a pre-configured or indefinite time period, such that the booking can be resumed from the cart itself, thereby avoiding need for performing the search again. The user may, within the stipulated time period, or any time, check the cart to view the search result that has been added to the cart, and then resume the ticket booking process. In an embodiment, on expiry of the pre-configured time period, the search result) in the cart may get cancelled/deleted automatically. In that case, the central ticket management in server 101 may provide option for the user to communicate with a customer service executive, using a suitable online chat option. In another embodiment, the central ticket management in server 101 may provide option for the user to re-initiate the ticket search process, with the same or new preferences/ settings. In an embodiment, the cart may support the transaction holding process.

If the user decides to continue with the ticket booking, then the booking module 203 provides option for the users to add (318) traveler details that are required for completing the ticket booking purpose. The traveler details may refer to name, address, ID proof, age, and such details pertaining to the traveler. In another embodiment, the central ticket management server 101 may identify automatically, certain required information pertaining to the user, based on history information related to previous transaction (s) the user has made. The central ticket management server 101 may also prompt the user to provide certain information and generate a user profile, and may later use the contents of the user profile for the purpose of seamen ticket booking.

Once the traveler details are added, the central ticket management server 101 may check (320) whether an approval mechanism has been enabled or not. The approval mechanism feature permits an authorized person to define a hierarchy and allow at least one authorized person in the hierarchy to verify the ticket details before proceeding with payment. If the approval mechanism has been enabled, then the central ticket management server 101 sends (324) the ticket details to at least one authorized person, as pre-configured. In this case, the ticket booking process may be automatically kept on hold for a per-defined time period by the central ticket management server 101, and the approval may have to be received within the time limit. If the approval is received after the time limit, then the central ticket management server 101 reinstates the booking, and if it fails, then looks for a new schedule with same or lower fare. If the ticket is not approved by the authorized person, then the central ticket management server 101 provides (328) option for the user to modify ticket. Using the booking modification option, the user may change and specify new requirements in terms of any or all of the parameters associated with the ticket booking request. The central ticket management server 101 then collects the new ticket booking request, and re-initiates the booking procedure from 302.

If the approval mechanism is not enabled, else if the authority approves the ticket, then the final ticket details are displayed (322) to the user or the monitoring authority. In an embodiment, the user may confirm at this point that the details are correct, otherwise use a modification option that may be provided to the user by the central ticket management server 101, to make any necessary changes to the booking. If the user is fine with the booking, then he/she can continue with the booking process. At this stage, the central ticket management server 101 provides (330) using the payment gateway 208, at least one payment option for the user to make payments. Upon successfully completing the payment process, the central ticket management server 101 displays payment confirmation and final ticket details to the user, and/or at least one monitoring authority.

In various other embodiments, the central ticket management in server 101 may also provide other associated services to the user. For example, the user may be provided with options to book hotels, or avail car rental services. In various other embodiments, the central ticket management server 101 may provide option for the user or any other authorized person to cancel ticket at different stages. In the first case, the central ticket management server 101 may allow cancellation of ticket during the ticket booking process i.e. before completing the ticket booking process. In this case, the central ticket management server 101 may cancel the procedure directly. In the second case, the cancellation request is initiated after the ticket booking has been confirmed. In this case, the central ticket management server 101 may inform the user about penalty charges as applicable for the ticket cancellation, and then cancels the ticket. In this case, the payment gateway 208 initiates fund transfer back to the user account.

The various actions, units, steps, blocks, or acts described in the method 300 can be performed in the order presented, in a different order, simultaneously, or a combination thereof. Further, in some embodiments, some of the actions, units, steps, blocks, or acts listed in the FIGS. 3A and 3B may be omitted, added, skipped, or modified without departing from the scope of the invention.

The embodiments disclosed herein can be implemented through at least one software program running on at least one hardware device and performing network management functions to control the network elements. The network elements shown in FIGS. 1 through 3B include blocks which can be at least one of a hardware device, or a combination of hardware device and software module.

The embodiment disclosed herein describes a method and system for facilitating seamen ticket booking. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in any programming language, or implemented by one or more software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for online seamen ticket booking, said method comprising: receiving, by a central ticket management server via a communication channel, a ticket booking request from a user system, wherein the ticket booking request comprises port, origin, destination, time, class of travel, and travel date information, wherein the central ticket management server comprises, a memory module, a booking module, a notifications module, an interface module, a location tracker, a live interaction module, a timer module, a payment gateway, and a report generation module; storing, by the memory module of the central ticket management server, the received ticket booking request with history information related to previous transactions for a user corresponding to the received ticket booking request; checking, by the central ticket management server, whether the ticket booking request is pertaining to a seamen ticket booking; identifying, by the central ticket management server, at least one seamen ticket that matches the ticket booking request, wherein the at least one seamen ticket is identified based on the history information of the memory module; fetching, by the central ticket management server and from an associated database, seamen and non-seamen ticket fare details for the identified ticket; communicating, by the central ticket management server, seamen ticket details via the communication channel to the user system to enable a user to select if the user wishes to proceed with the booking, wherein the seamen ticket details comprises fare comparison between the seamen ticket and a non-seamen ticket; if the user decides to proceed with the booking, requesting, by the central ticket management server, approval from an authority upon an approval mechanism being enabled to allow at least one authorized person to verify the seamen ticket details; providing, by the central ticket management server, at least one ticket modification option for the user based on the stored ticket booking request and history information of the memory module; booking, by the central ticket management server, a ticket upon receiving approval from the authority; and providing, by the central ticket management server, details of the booked ticket to at least one user, passenger, and traveler, using said central ticket management server; wherein the method further comprises tracking, by a the location tracker of the central ticket management server, a location of the user for determining a schedule of the user, wherein the location tracker comprises a geolocation tracking and identification system.

2. The method as claimed in claim 1, wherein the identifying of at least one seamen ticket that matches the ticket booking request further comprises: identifying, by the central ticket management server, at least one nearest airport to the origin location; identifying, by the central ticket management server, at least one nearest airport to the destination location, using said central ticket management server; and checking availability of at least one flight between said identified nearest airports.

3. The method as claimed in claim 1, wherein the requesting approval from the authority further comprises: putting, by the central ticket management server, an ongoing ticket booking transaction on hold; sending, by the central ticket management server, the seamen ticket details to at least one authorized person; and collecting, by the central ticket management server, a response from the at least one authorized person, pertaining to the seamen ticket.

4. The method as claimed in claim 3, wherein the putting the ongoing ticket booking transaction on hold further comprises holding, by the central ticket management server, the ongoing ticket booking transaction at a given fare for a pre-set time period.

5. The method as claimed in claim 4, wherein the ongoing ticket booking transaction fails on expiry of the pre-set time period.

6. The method as claimed in claim 1, wherein the providing of the least one booking modification option further comprises: providing, by the central ticket management server, an option for the user system to modify the ticket booking request; collecting, by the central ticket management server, a modified ticket booking request; and identifying, by the central ticket management server, at least one seamen ticket that matches the modified ticket booking request.

7. The method as claimed in claim 1, wherein the comparison between the seamen ticket fare and the non-seamen ticket fare is performed by the central ticket management server.

8. The method as claimed in claim 1, wherein the online seamen ticket booking is executed, by the central ticket management server, at a business to business (B2B) level.

9. The method as claimed in claim 1, wherein the online seamen ticket booking is executed, by the central ticket management server, at a business to customer (B2C) level.

10. The method as claimed in claim 1, wherein at least one payment option is provided, by the central ticket management server, for the user system for making online transactions.

11. The method as claimed in claim 1, wherein at least one notification is sent by the central ticket management server to at least one user system, wherein the notification indicates occurrence of at least one event.

12. The method as claimed in claim 1, wherein at least one of a visa information, a visa requirement, and an online visa application option is provided by the central ticket management server to the user system.

13. The method as claimed in claim 1, wherein a visa information is provided by the central ticket management server to the user system, wherein the visa information is pertaining to at least one of seamen, marine, and non-seamen, and comprises information on whether the visa is required to travel in an identified route of the seamen, marine, and non-seamen.

14. The method as claimed in claim 1, wherein a visa requirement is provided by the central ticket management server to the user system, wherein the visa information further comprises documentation, and formalities for obtaining the visa, to an identified destination company.

15. The method as claimed in claim 1, wherein information on offshore fare is provided to the user system.

16. The method as claimed in claim 1, wherein information on an ex local fare is provided to the user system.

17. The method as claimed in claim 16, wherein said ex local fare information is provided for at least one of a business to business (B2B) and business to customer (B2C) customer.

18. The method as claimed in claim 1, wherein an online ticket cancellation option is provided at a business to business (B2B) and business to customer (B2C) level.

19. The method as claimed in claim 1, wherein the seamen ticket details are saved in a cart, wherein the seamen ticket booking process is resumed based on the seamen ticket details saved in the cart.

20. A central ticket management server for online seamen ticket booking, the server comprising: a memory module, a booking module, a notifications module, an interface module, a location tracker, a live interaction module, a timer module, a payment gateway, and a report generation module, wherein the central ticket management server is configured for: receiving a ticket booking request via a communication channel from a user system, wherein the ticket booking request comprises port, origin, destination, time, class of travel and travel date information; storing, by the memory module of the central ticket management server, the received ticket booking request with history information related to previous transactions for a user corresponding to the received ticket booking request; checking whether the ticket booking request is pertaining to a seamen ticket booking; identifying at least one seamen ticket that matches the ticket booking request, wherein the at least one seamen ticket is identified based on the history information of the memory module; fetching from an associated database, seamen and non-seamen ticket fare details for the identified ticket; communicating seamen ticket details to the user system via the communication channel to enable a user to select if the user wishes to proceed with the booking, wherein the seamen ticket details comprises fare comparison between the seamen ticket and a non-seamen ticket; if the user decides to proceed with the booking, requesting approval from an authority, upon an approval mechanism is being enabled to allow at least one authorized person to verify the seamen ticket details; providing at least one ticket modification option for the user system based on the stored ticket booking request and history information of the memory module; booking ticket upon receiving approval from the authority; and providing details of the booked ticket to at least one user, wherein the location tracker is configured to track a location of the user for determining a schedule of the user, and wherein the location tracker comprises a geolocation tracking and identification system.

21. The central ticket management server as claimed in claim 20, wherein the booking module is configured for requesting approval from the authority by: putting ongoing ticket booking transaction on hold; sending the details of the seamen ticket to at least one authorized person; and collecting a response from the at least one authorized person, pertaining to the seamen ticket.

22. The central ticket management server as claimed in claim 20, wherein the booking module is configured to put the ongoing ticket booking transaction on hold for a pre-set time period.

23. The central ticket management server as claimed in claim 20, wherein the providing of the at least one ticket modification option further comprises: providing an option for the user system to modify the ticket booking request; collecting a modified ticket booking request; and identifying at least one another seamen ticket that matches the modified ticket booking request.

24. The central ticket management server as claimed in claim 20, wherein the central ticket management server is further configured to display the comparison between the seamen ticket fare and the non-seamen ticket fare.

25. The central ticket management server as claimed in claim 20, further configured to execute the online seamen ticket booking at a business to business (B2B) level.

26. The central ticket management server as claimed in claim 20, further configured to execute the online seamen ticket booking at a business to customer (B2C) level.

27. The central ticket management server as claimed in claim 20, further comprising a payment gateway configured to provide at least one payment option for making online transaction for the user.

28. The central ticket management server as claimed in claim 20, further comprising a notification module configured to send at least one notification to at least one user, wherein the notification indicates occurrence of at least one event.

29. The central ticket management server as claimed in claim 20, further configured to provide at least one of a visa information, a visa requirement, and an online visa application option to the user system.

30. The central ticket management server as claimed in claim 20, further configured to store the seamen ticket details in a cart, wherein the seamen ticket details saved in the cart are used to resume the seamen ticket booking process.

31. The central ticket management server as claimed in claim 20, further configured to provide information on offshore fare to the user system.

32. The central ticket management server as claimed in claim 20, further configured to provide information on ex local fare to the user system.

\* \* \* \* \*